Nov. 19, 1957   C. GUZIK   2,813,370
ANIMAL TRAP
Filed April 4, 1956

INVENTOR.
CASIMIR GUZIK
BY
*Fay & Fay*
ATTORNEYS

United States Patent Office 2,813,370
Patented Nov. 19, 1957

2,813,370

ANIMAL TRAP

Casimir Guzik, Oakwood Village, Ohio

Application April 4, 1956, Serial No. 576,155

2 Claims. (Cl. 43—70)

This application, relating to an animal trap, is particularly directed to a trap that may either kill or capture small animals. This animal trap is designed to either capture or kill, as by drowning, as desired.

The trap consists of a rectangular box having an open top, with a pair of dihedral-shaped doors supported longitudinally along either side thereof, adapted to close under certain conditions and keep the animal retained therein. Water, a chemical or various solutions may be used in the trap, if it is desired to kill the animal.

The animal trap of this invention is designed to hold an attractive bait on a pair of doors supported over a container or box and upon pull on the bait to simultaneously release the doors whereby the weight of the animal platform portions of said door causes a second pair of doors or closure portions to close down upon the animal and pass the animal into the box.

An object of this invention is to provide a new and improved animal trap particularly for rodents and the like.

A further object of this invention is to provide a new and improved animal trap having a pair of animal platforms at the top of the box adapted to pivot downward under certain conditions and drop, i. e., collapse, a pair of closure portions which are at a dihedral angle with respect to the animal platforms to a position wherein they close the opening over the box.

A further object of this invention is to provide a new and improved release mechanism in an aminal trap wherein a single release catch will collapse both doors simultaneously with a minimal movement of the bait and with an accurate adjustment between the doors so that both doors collapse at the same instant.

To the accomplishment of the foregoing and related ends, said invention consists of the means hereinafter fully described and particularly pointed out in the claims; the following description setting forth in detail one means of carrying out the invention, such disclosed means, however, constituting but one of the various ways in which the principles of the invention may be used.

Figure 1:
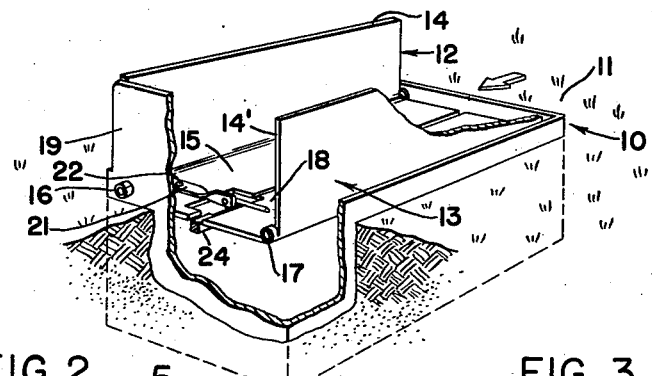
Fig. 1 is a partially cut-away schematic view of the animal trap of this invention, shown in set position.

In the drawings, 10 shows a rectangular box structure which in this instance is positioned in the ground, shown at 11, though, of course, the trap could be placed out in the open or in an enclosure. The dihedral door structures, generally, are numbered 12 and 13, respectively. Each of the dihedral doors has a closure portion shown at 14 and 14', respectively, and a platform portion which is adapted to collapse, shown at 15 and 18, respectively. Each of the dihedral elements, hereinafter referred to as "doors," is pivoted longitudinally along the edge of the box as by pivot means 16 and 17. At one end of the box there is an end element shown at 19, though, of course, a proper design of a shield on the bait would cause the animal to pull the bait from the proper direction to actuate the trap.

Figure 2:
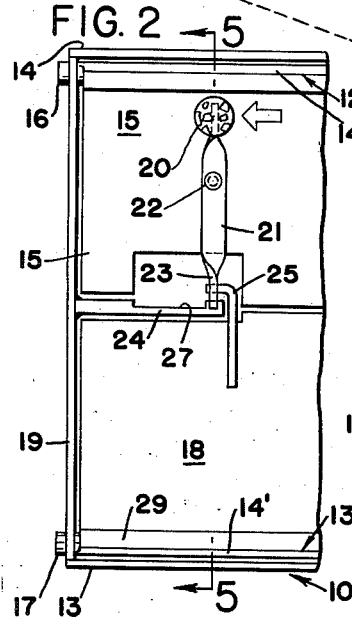
Fig. 2 is a broken plan view of Fig. 1, showing the arrangement of the bait and doors.
Figure 3:
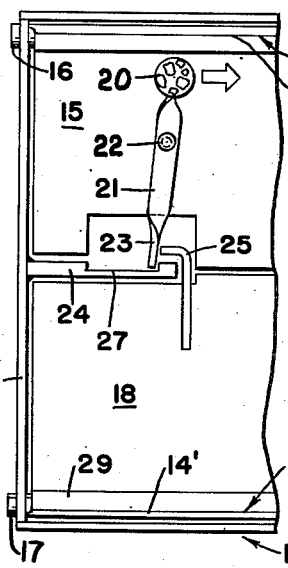
Fig. 3 is a further broken plan view of Fig. 1, showing the movement of the bait and how the release catch will cause each of the doors to collapse simultaneously.

In Fig. 2 there is shown the bait secured to one end of arm element 21 which is pivotally connected as at 22 to the platform 15. The opposite end of the arm 21 is shown at 23, and this end is adapted to rest on the ledge provided by an arm 24 projecting from the end wall 19. The arm element 21 is releasably secured to a hook element 25 which is attached to the platform 18 and is adapted to have the hook portion pass through an opening 26 in the twisted end 23 of the arm 21. The end 23 of arm 21 is adapted to rest on the ledge of projecting arm 24 and when the arm 21 is pivoted as shown in Fig. 3 the end 23 is free to drop through the recessed portion 27 of the arm 24, while simultaneously releasing the hook portion 25 from the opening 26 of the arm. By proper positioning of the pivot 22 with respect to the ends of the arm 21 a slight pull or a strong pull on the bait 20 could be used to actuate the trap.

Figures 5, 6:
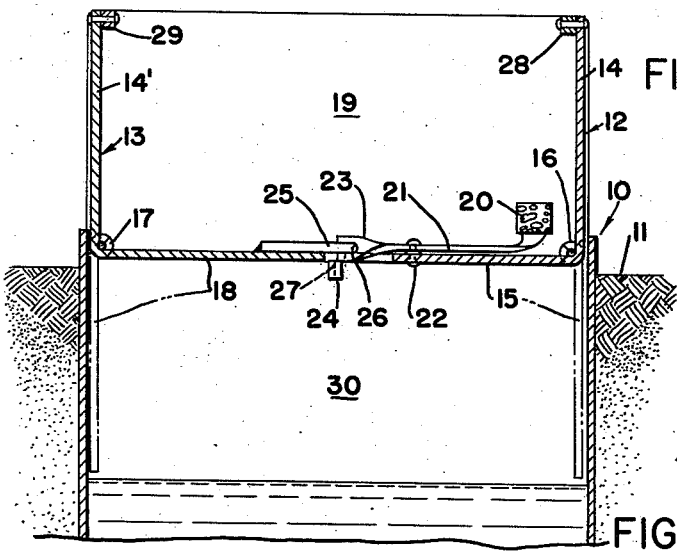
Fig. 5 is a cross-sectional view along the line 5—5 of Fig. 2 through the release mechanism, showing a side view of the release element with bait attached.
Fig. 6 is a further cross-sectional view along the line 6—6 of Fig. 4, showing the dihedral door elements in closed position.

The dihedral doors are shown particularly in connection with Fig. 5 where 12 and 13 refer generally to these elements, and 14 and 14' are the upright or closure portions having a weighted portion shown at 28 at the edge thereof to increase the speed with which the dihedral sides collapse. Of course, it will be appreciated that the sides 14 and 14' need not be entirely vertical but might be at an acute angle with respect to the floor. There is a similar weight shown at 29.

Figure 4:
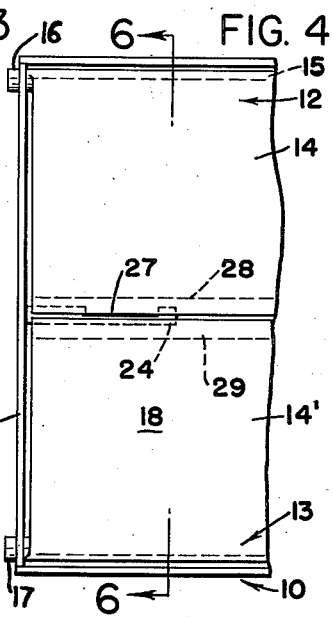
Fig. 4 is a broken plan view of Fig. 1, showing the closure portions in position when the floor has collapsed.

The arrow indicates the direction of approach in Fig. 1 and in Fig. 2 of an animal entering the trap, and the arrow in Fig. 3 indicates the direction of pull on the bait to release the catch. The operation of the release catch is clear from a study of Figs. 3, 4 and 5. In Fig. 3 it is seen that a pull upon the bait will cause the arm element 21 to be released from the hook portion 25 attached to the dihedral side 13, and at the same time the arm will slide off the rest element 24 and cause both doors to collapse simultaneously. Because of the combined weights of the animal and of the weights 28 and 29, the closure elements will close as is shown in Fig. 4 and cause the animal to pass into the interior of the container 30. Of course, it will be understood that weights 28 and 29 would hold the dihedral doors or closure members in position and prevent escape of the animal. A lug may be placed on one dihedral door to contact the other door so that the raising of one door by the animal necessitates the lifting of both closure members. The container may be filled with a chemical water, or be empty in the event it is desired to capture the animal alive.

Although the present invention has been described in connection with a preferred embodiment, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. An animal trap comprising a generally rectangular container member having end walls and parallel sides along a substantial portion of said container, and a pair of door members pivoted to the container, each of which includes an animal platform and a closure for the container forming a dihedral angle, one of said doors having a hook member projecting from the top surface of the platform portion of the door, the other of said doors having a bait holding member pivotally secured to the platform portion thereof by means of an arm, said arm having an aperture adjacent the end thereof, said hook member being adapted to be received in said aperture, and a stop member projecting from one end wall of the container on which said arm rests whereby a pull on the bait will pivot said arm causing said aperture to slip from the hook element while the arm slides off the rest allowing the doors to pivot downwardly, said closure portion of each of said doors being of substantially the same size as the platform projecting therefrom, said closure portions being adapted to close when the trap is sprung.

2. An animal trap comprising a container member having side walls parallel to one another and oppositely disposed from one another, a pair of door members pivoted to the container, each of said door members including an animal platform and a closure for the container forming an acute dihedral angle with respect to one another, said doors each closing one-half of the distance between the side walls, a rest element projecting centrally between said dihedral angle door members for supporting the platforms in set position and the closures in closed position, the animal platform portion of one of said door members having a hook element projecting towards the opposite door member, the other of said platform members having a bait holder on which a bait is attached, and including an arm portion pivotally secured to said other platform member, said arm having an aperture in the opposite end from said bait holder adapted to register in a horizontal plane with said hook member, a projection on said arm adapted to touch said rest element for holding the platforms in horizontal set position whereby a pull on the bait will pivotally move said arm pulling said aperture in said arm from the hook element and off said rest releasing the platform members to pivot downwardly, said closure members which form a dihedral angle with said platform members pivoting downwardly to close said container, and a weight on said closure members to cause the door to pivot more rapidly to said rest when the trap is sprung.

References Cited in the file of this patent
UNITED STATES PATENTS

| | | |
|---|---|---|
| 74,256 | Thomas | Feb. 11, 1868 |
| 572,811 | Krauth | Dec. 8, 1896 |